US012809759B2

(12) United States Patent
Han et al.

(10) Patent No.: US 12,809,759 B2
(45) Date of Patent: Nov. 24, 2026

(54) METHODS AND SYSTEMS FOR CHAOS TESTING

(71) Applicant: JP Morgan Chase Bank, N.A., New York, NY (US)

(72) Inventors: ChanYop Han, Lake Villa, TX (US); Udayakumaran Sugumaran, Flower Mound, TX (US); Maria Martinez, The Colony, TX (US); Vikas Kohli, Robbinsville, NJ (US)

(73) Assignee: JP Morgan Chase Bank, N.A., New York, NY (US)

( * ) Notice: Subject to any disclaimer, the term of this patent is extended or adjusted under 35 U.S.C. 154(b) by 232 days.

(21) Appl. No.: 18/886,848

(22) Filed: Sep. 16, 2024

(65) Prior Publication Data

US 2026/0079825 A1 Mar. 19, 2026

(51) Int. Cl.
*G06F 11/3668* (2025.01)
*G06F 11/3604* (2025.01)

(52) U.S. Cl.
CPC ...... *G06F 11/3692* (2013.01); *G06F 11/3604* (2013.01); *G06F 11/3684* (2013.01); *G06F 11/3688* (2013.01)

(58) Field of Classification Search
CPC ............. G06F 11/3604; G06F 11/3684; G06F 11/3688; G06F 11/3692
See application file for complete search history.

(56) References Cited

U.S. PATENT DOCUMENTS

| | | | | |
|---|---|---|---|---|
| 11,847,046 | B1 * | 12/2023 | Ayyadurai | G06F 11/3684 |
| 12,353,318 | B1 * | 7/2025 | Saxena | G06F 11/3684 |
| 2019/0213115 | A1 * | 7/2019 | Takawale | G06F 11/3676 |
| 2021/0263836 | A1 * | 8/2021 | Singh | G06F 11/3684 |
| 2025/0217270 | A1 * | 7/2025 | Singh | G06F 11/3688 |

* cited by examiner

*Primary Examiner* — Marina Lee
(74) *Attorney, Agent, or Firm* — Wood IP, LLC; Theodore A. Wood

(57) ABSTRACT

Provided are systems for automated chaos including a processor and a memory having instructions stored thereon. The instructions, when executed, cause the processor to perform certain operations including connecting to an application infrastructure with one or more applications and inspecting a code of the one or more applications and configuring a chaos experiment. The configuring includes identifying fault domains of the applications. The operations also include enabling pre-execution tasks, including load testing and observability, executing the chaos experiment, and automatically subjecting the applications to features of the chaos experiment. The features may be configured to trigger a fault to occur from the applications. The operations collect information from the applications as a result of executing the chaos experiment and execute an AI/ML routine on the information to output a result. The result is representative of the resilience of the applications.

29 Claims, 9 Drawing Sheets

100

400

900

METHODS AND SYSTEMS FOR CHAOS TESTING

TECHNICAL FIELD

The present disclosure relates to methods and systems for chaos testing. Particularly, the disclosed methods and systems relate to automated chaos testing of software systems.

BACKGROUND

Chaos testing is a testing methodology that aims to assess the robustness of software systems. In this paradigm, deployed software systems are subjected to controlled experiments that simulate real-life events. Such experiments may simulate hardware failures, network outages, database issues, bugs, attacks, etc. The software systems'response to these experiments are then studied to assess reliability, and remedial actions in the design and/or the deployment of the software systems under test may be taken to insulate the systems under test against stressors like the ones simulated by the controlled experiments.

In the state-of-the-art, there are multiple problems with the execution of chaos testing, and these problems are exacerbated by the scale of the systems that are being tested. For example, in the state-of-the-art, development and site reliability engineering (SRE) teams can spend significant time and manual efforts in every stage of the chaos testing lifecycle. This expenditure of time and efforts can range from requirements gathering, design, setup, configuration, execution, evidence collection, and to the analysis of results and to reporting.

Further, other shortcomings can include missing/incomplete requirements and experiment designs possibly leading to untested resiliency gaps. In yet other problematic situations, chaos testing is conducted outside of continuous integration (CI) and continuous deployment (CD) frameworks (CI/CD). In such cases, chaos testing procedures are conducted only on major event production change (MEPC) events manually. Furthermore, in typical chaos testing scenarios, there are inconsistencies in chaos test evidence, metrics, data collection, and there is a lack of expertise in result analysis. All these shortcomings lead to resiliency gaps in the systems under test.

SUMMARY

The embodiments featured herein help solve or mitigate the above noted issues as well as other issues known in the art. For example, the embodiments provide methods and systems that integrate chaos testing in CI/CD frameworks. With this novel approach, an application may be tested frequently, it may be validated frequently, and it may be validated consistently. Generally, the embodiments provide end-to-end solutions that automate and configure chaos testing into CI/CD frameworks.

With the embodiments, automated chaos testing can help set up, execute and collect evidence during testing. The testing is affected in real-time, eliminating manual steps and therefore standardizing the process. The embodiments further provide validation of application resiliency through integration with observability tools. They further provide metrics for chaos experiments for artificial intelligence (AI). Furthermore, the embodiments can provide one or more resilience scores because of a chaos testing procedure, and they may provide remedial actions for achieving fault-tolerant solutions.

For example, in one exemplary embodiment, there is provided a system, comprising a processor and a memory including instructions, which when executed, cause the processor to perform operations including connecting to an application infrastructure including one or more applications. The processor also inspects a code of the one or more applications, configures a chaos experiment, the configuring including identifying fault domains of the one or more applications, and enables pre-execution tasks, including load testing and observability. The processor executes the chaos experiment, the executing including automatically subjecting the one or more applications to one or more features of the chaos experiment, the one or more features being configured to trigger a fault from the fault domains, collects information from the one or more applications as a result of executing the chaos experiment, and AI/machine learning (ML) routine on the information to output a result, the result being representative of the resilience of the one or more applications.

The system of any preceding clause, wherein the operations further include continually integrating the chaos experiment with the one or more applications by maintaining a connection to the application infrastructure.

The system of any preceding clause, wherein the operations further include continually deploying the chaos experiment with the one or more applications by maintaining a connection to the application infrastructure.

The system of any preceding clause, wherein inspecting the code further includes generating an assessment of the health of the one or more applications.

The system of any preceding clause, wherein the operations further include pre-executing the chaos experiment to verify observability.

The system of any preceding clause, wherein the operations further include pre-executing the chaos experiment to initiate load testing.

The system of any preceding clause, wherein executing the chaos experiment further includes constructing an application programming interface (API) for automated execution of the chaos experiment.

The system of any preceding clause, wherein the information includes events, traces, metrics, and logs associated with one or more outputs of the one or more applications before, during and after executing the chaos experiment.

The system of any preceding clause, wherein the AI/ML routine is configured to output the result in view of the information and past information.

The system of any preceding clause, wherein the result includes at least one of a resiliency score, a recommendation, and a report.

Another exemplary embodiment includes a method residing as instructions on a non-transitory computer-readable medium, the instructions configured to cause a processor to perform operations. The operations comprise connecting to an application infrastructure including one or more applications, inspecting a code of the one or more applications, configuring a chaos experiment, the configuring including identifying fault domains of the one or more applications, and enabling pre-execution tasks, including load testing and observability. The operations also include executing the chaos experiment, the executing including automatically subjecting the one or more applications to one or more features of the chaos experiment, the one or more features being configured to trigger a fault from the fault domains, collecting information from the one or more applications as a result of executing the chaos experiment, and executing an AI/ML routine on the information to output a result, the result being representative of the resilience of the one or more applications.

The method of any preceding clause, wherein the operations further include continually integrating the chaos experiment with the one or more applications by maintaining a connection to the application infrastructure.

The method of any preceding clause, wherein the operations further include continually deploying the chaos experiment with the one or more applications by maintaining a connection to the application infrastructure.

The method of any preceding clause, wherein inspecting the code further includes generating an assessment of the health of the one or more applications.

The method of any preceding clause, wherein the operations further include pre-executing the chaos experiment to verify observability.

The method of any preceding clause, wherein the operations further include pre-executing the chaos experiment to initiate load testing.

The method of any preceding clause, wherein executing the chaos experiment further includes constructing an API for automated execution of the chaos experiment.

The method of any preceding clause, wherein the information includes events, traces, metrics, and logs associated with one or more outputs of the one or more applications before, during and after executing the chaos experiment.

The method of any preceding clause, wherein the AI/ML routine is configured to output the result in view of the information and past information.

The method of any preceding clause, the result includes at least one of a resiliency score, a recommendation, and a report.

Yet another exemplary embodiment includes a non-transitory computer-readable medium including instructions configured to cause a processor to perform operations. The operations comprise connecting to an application infrastructure including one or more applications, inspecting a code of the one or more applications, configuring a chaos experiment, the configuring including identifying fault domains of the one or more applications, and enabling pre-execution tasks, including load testing and observability. The operations also include executing the chaos experiment, the executing including automatically subjecting the one or more applications to one or more features of the chaos experiment, the one or more features being configured to trigger a fault from the fault domains, collecting information from the one or more applications as a result of executing the chaos experiment, and executing an AI/ML routine on the information to output a result, the result being representative of the resilience of the one or more applications.

The non-transitory computer-readable medium of any preceding clause, wherein the operations further include continually integrating the chaos experiment with the one or more applications by maintaining a connection to the application infrastructure.

The non-transitory computer-readable medium of any preceding clause, wherein the operations further include continually deploying the chaos experiment with the one or more applications by maintaining a connection to the application infrastructure.

The non-transitory computer-readable medium of any preceding clause, wherein the operations further include pre-executing the chaos experiment to verify observability.

The non-transitory computer-readable medium of any preceding clause, wherein the operations further include pre-executing the chaos experiment to initiate load testing.

The non-transitory computer-readable medium of any preceding clause, wherein executing the chaos experiment further includes constructing an API for automated execution of the chaos experiment.

The non-transitory computer-readable medium of any preceding clause, wherein the information includes events, traces, metrics, and logs associated with one or more outputs of the one or more applications before, during and after executing the chaos experiment.

The non-transitory computer-readable medium of any preceding clause, wherein the AI/ML routine is configured to output the result in view of the information and past information.

The non-transitory computer-readable medium of any preceding clause, the result includes at least one of a resiliency score, a recommendation, and a report Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

Figure 1:
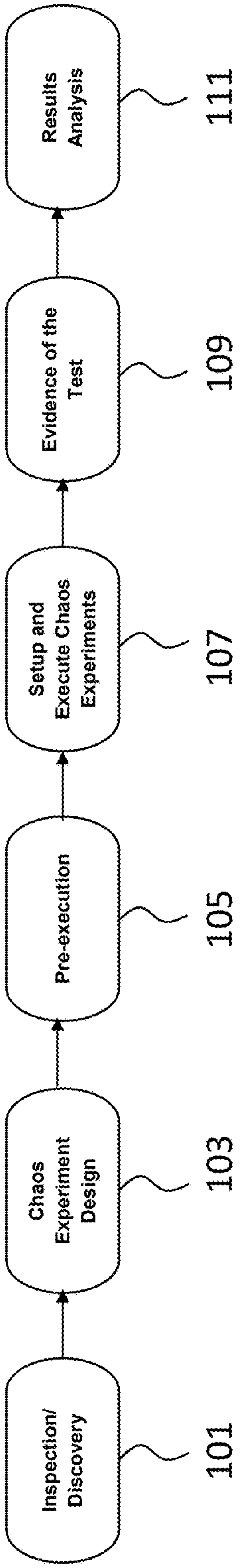
FIG. 1 illustrates a method for chaos testing automation in accordance with embodiments of the present disclosure.

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

The embodiments described herein are configured structurally to reduce toil and cost; they provide automated chaos testing that will reduce manual steps to onboarding and inconsistencies in configuration, execution and reporting. Such savings will save time and resources. The embodiments further provide CI/CD integration. With this approach, chaos testing can be integrated with continuous testing, allowing chaos testing experiments to run consistently across all applications during the development lifecycle.

The embodiments provide automated evidence collection and reporting as part of the pipeline to get results in real time and reduce the typical burden of exporting data from different data sources. They provide predefined cases to keep the consistency metrics for similar platforms and provide better observability. The embodiments also provide guidelines and standardized recommended experiments for the software systems under test, and they can provide a resiliency score and recommendations based on analysis. Generally, the embodiments will help reduce the time of adoption of chaos testing by development/SRE teams, and they will allow these teams to quickly understand the limitations of their systems under test.

The embodiments provide a comprehensive automation and integration of chaos testing within CI/CD frameworks. Unlike traditional chaos testing methods that require significant manual effort and are often conducted outside of CI/CD frameworks, embodiments of the disclosure provide an end-to-end automated solution. The embodiments integrate chaos testing into CI/CD pipelines, allowing for frequent and consistent validation of applications throughout the development lifecycle. The entire chaos testing process is automated, from setup and execution to evidence collection and analysis, eliminating manual steps and standardizing the process.

The embodiments enable real-time execution of chaos experiments and automated collection of evidence, ensuring immediate feedback and reducing the time and effort required for manual data collection. The present embodiments also leverage AI and ML to analyze the collected data, identify patterns and trends, and generate resilience scores and recommendations, providing deeper insights into application resiliency.

Integrated observability tools validate application health, detect monitoring gaps, and ensure that alerts are configured and triggered appropriately during chaos experiments. The embodiments also include automated load testing to simulate user traffic and validate application performance under stress conditions, further enhancing the robustness of the testing process. Further, the embodiments provide real-time visualization of results, generates detailed reports, and offers actionable recommendations to improve system resilience, reliability, and cost-efficiency.

Overall, the embodiments provide a fully automated, integrated, and intelligent approach to chaos testing, significantly improving the efficiency, consistency, and effectiveness of testing processes in modern software development environments.

FIG. 1 illustrates a method 100 according to an embodiment. The method 100 may be embodied as instructions in a computing device, like a processor (e.g., see FIG. 9), and once the instructions are executed by the computing device, they configure the computing device to perform operations consistent with chaos testing automation. The computing device may be communicatively coupled to an application infrastructure. The method 100 may include executing an inspection/discovery subroutine 101.

The subroutine 101 may include a code inspection module configured to cause the computing device to inspect repositories hosting the code of applications located in the application infrastructure. For example, the subroutine 101 may terraform codebase for the application infrastructure and its components'configuration. The subroutine 101 may be configured to inspect the repositories for deployment configurations.

Furthermore, the subroutine 101 may include a resource discovery module that is configured to discover cloud services in the application infrastructure and which components are provisioned for the cloud services discovered. Furthermore, the subroutine 101 may include a validation module for validating applications. In other words, the validation module may determine whether an application is in a health state.

The method 100 can further include executing a chaos experiment design subroutine 103 configured to cause the computing device to provision, i.e., to design, a chaos experiment. Designing the chaos experiment may include identifying fault domains of the application infrastructure. It may be configured to identify frequent and impactful root-cause events. Furthermore, designing the chaos experiment may include designing tasks for each fault domain and root-cause event. This may include developing different hypotheses, blast radii, blast magnitudes, and abort conditions.

The method 100 can further include executing a pre-execution subroutine 105 configured to cause the computing device to pre-execute the chaos experiment designed by the chaos experiment design subroutine 103. Pre-execution may be affected to enable observability. This may include validating that alerts are in place and configured and enabled. Furthermore, this may include detecting any observability and monitoring gap configuration. Furthermore, enabling observability may include enabling tagging to use for correlation, and further, pre-execution may include finding missing alerts for a real issue, which can cause failures or an increase in response times. Furthermore, pre-execution may be affected by initiating load testing. This can include auto-starting a load testing task to simulate traffic inside one or more applications in the application infrastructure.

The method 100 can further include executing a subroutine 107 configured to cause the computing device to setup and execute the provisioned chaos experiment. This may include constructing an API payload for each experiment based on the discovery and design stages (subroutines 101 and 103). This may also include automating execution of the chaos experiments or of some or all of its features. Furthermore, the subroutine 107 may be further configured to cause the computing device to monitor and detect unexpected failures and to auto-abort the chaos experiment's execution.

The method 100 can further include executing a subroutine 109 configured to cause the computing device to gather evidence of the chaos experiment's execution. This may include collecting events, traces, metrics, and logs to identify any potential issue, and to use the evidence of the testing when the testing is computed. The subroutine 109 can further validate that alters have triggered, and it can detect any observability and monitoring gap configuration.

Furthermore, the subroutine 109 may further validate that an application has recovered, and it also may auto close all the alerts. The subroutine 109 may further abort the load testing and validate that traffic is back to normal and subsequently capture results. Furthermore, the subroutine 109 may collect the results from chaos testing.

The method 100 can further include executing a subroutine 111 configured to cause the computing device to analyze the results of the chaos testing. Here, analysis may include AI/ML routines that take as their input the result data from the chaos testing. The routines may use data collected during the experiment's execution to identify patterns, trends, and generate insights. The routines can further correlate data between chaos results, an application, and system performances and errors. For instance, the AI/ML routines may take as their inputs the events, traces, metrics, logs, and alerts triggered by the chaos experiment's execution.

The subroutine 111 may be further configured to cause the computing device to output a resiliency score. The resiliency score may define the success criteria based on the results from each experiment type. The subroutine 111 may further include providing recommendations and identifying in real-time weaknesses that the one or more applications have. These may include weaknesses in system configuration for resilience, reliability, and observability. Furthermore, the subroutine 111 may include providing additional recommendations if infra-configurations need to be scaled down to reduce cost. The subroutine 111 may further be configured to generate reports to allow visualizations in real-time, with the results and proof that testing has been completed. The results may be recorded in a storage or transmitted via a notification service.

Figure 2:
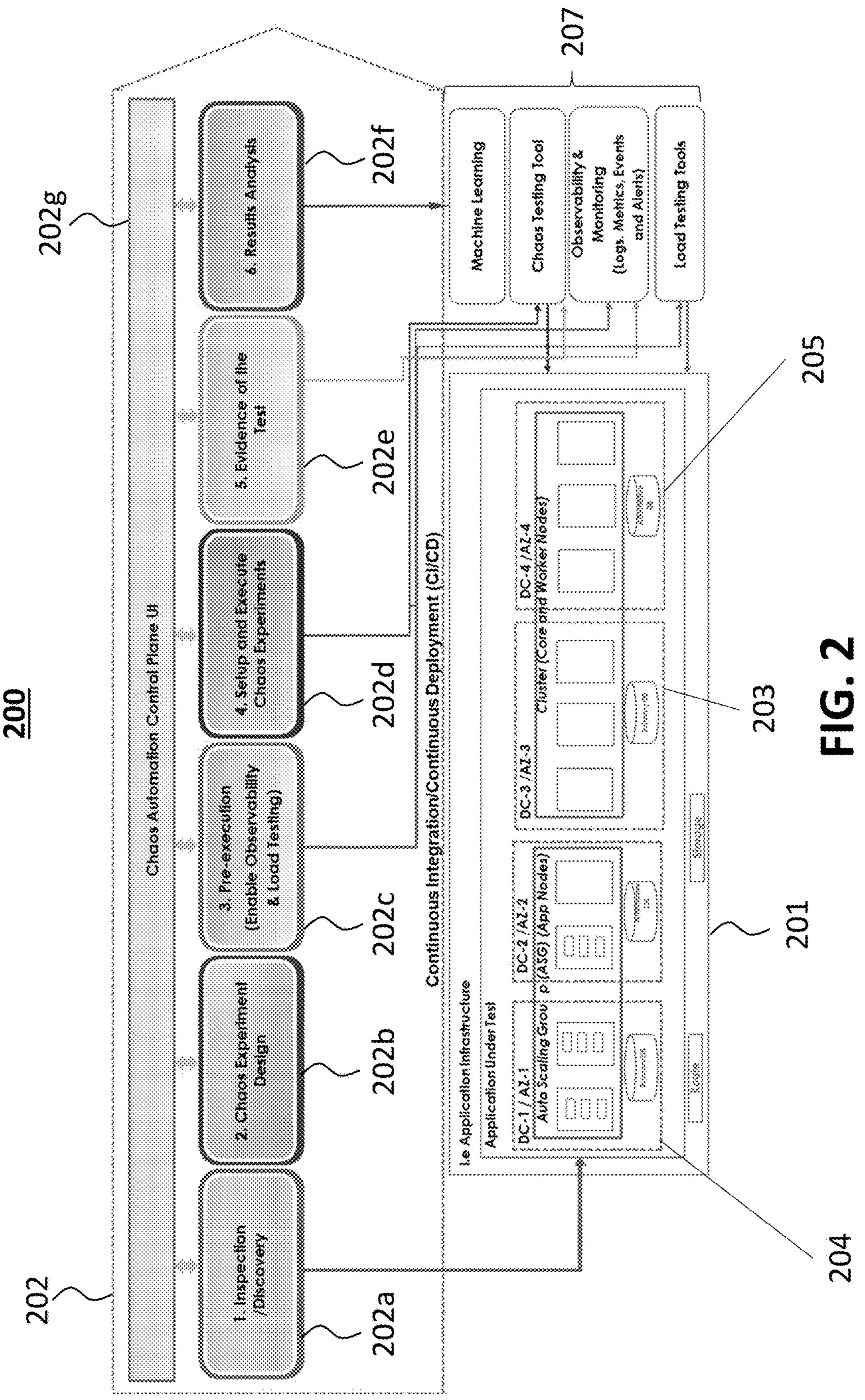
FIG. 2 illustrates a system for integrating chaos testing into CI/CD frameworks with various subsystems and tools.

FIG. 2 illustrates a system for integrating chaos testing into CI/CD frameworks with various subsystems and tools 200, according to the embodiments. The system 200 can include a subsystem 202 that is configured to continually integrate and continually deploy with an application infrastructure 201. The application infrastructure may include a plurality of applications (204, 203, and 205). The applications may be varied in nature, including auto-scaling groups, clusters, primary and alternative databases.

Without limitations, the applications may include other components typical to current practice in application engineering. Storage for the applications may be local or remote to the application infrastructure 201. The subsystem 202 may further include a module 207 that includes a variety of tools configured to interface with the application infrastructure 201. Such tools may be a ML module, a chaos testing tool, observability and monitoring tools, and load testing tools.

The subsystem 202 may be configured to execute the method 100, invoking tools from the module 207 to perform the various tasks of the method 100 described above. Briefly, the subsystem 202 may be configured to perform inspection and discovery (202*a*), chaos experiment design (202*b*), pre-execution (202c), setup and execution of chaos experiments (202*d*), evidence gathering (202*e*), and result analysis (202*f*). The subsystem 202 may further include a chaos automation control plane (202*g*), which provides a user interface.

Figure 3:
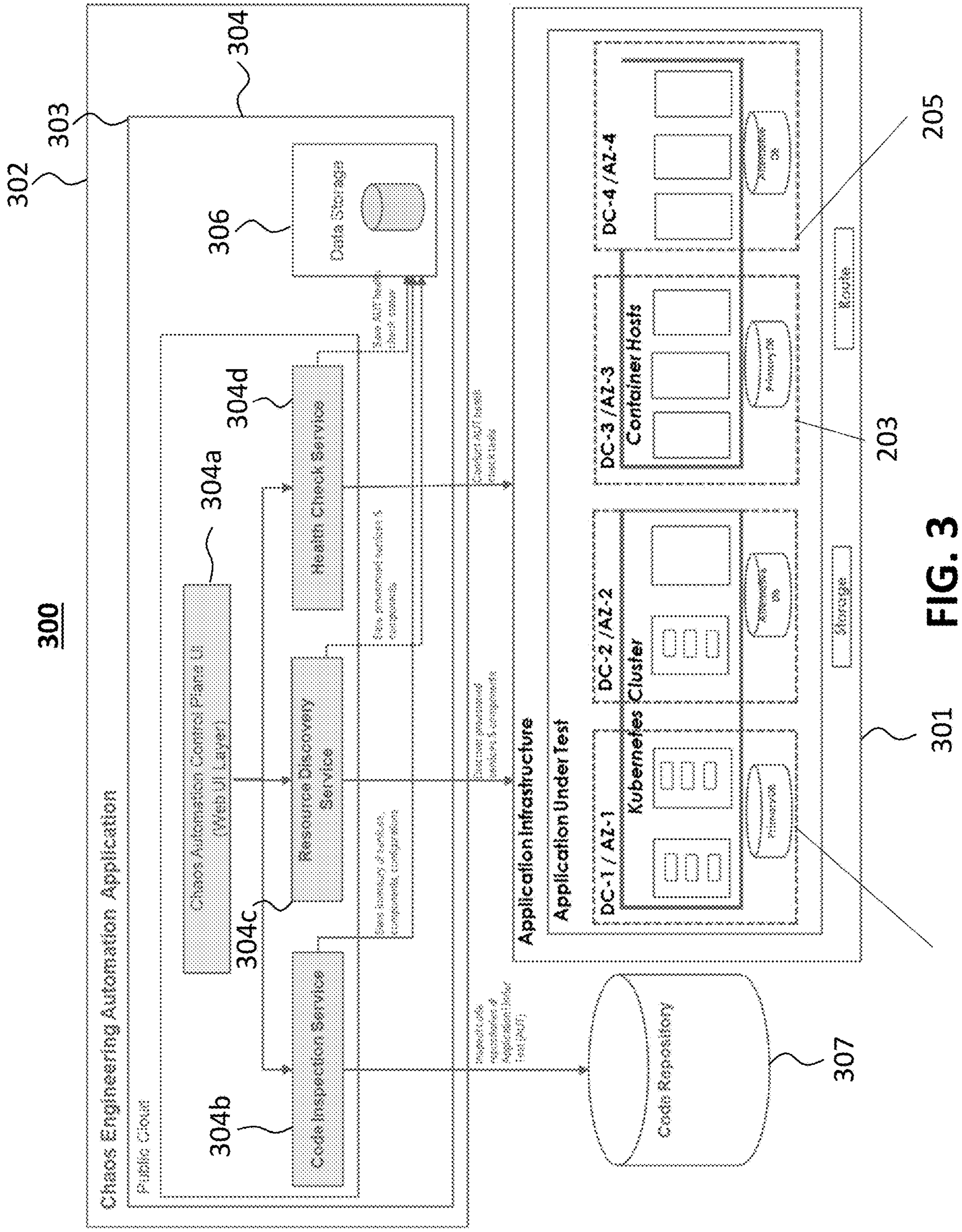
FIG. 3 illustrates a system for chaos engineering automation application interfacing with an application infrastructure and its code base for inspection and discovery.

FIG. 3 illustrates a system for chaos engineering automation application interfacing with a public cloud and an application infrastructure 300 according to one exemplary embodiment. The system 300 includes a subsystem 302, which is an embodiment of the inspection/discovery subroutines of the method 100, as depicted in FIG. 1 and as part of the subsystem 202 in FIG. 2. The subsystem 302 may be configured to execute automated chaos testing, and generally, it may be part of a chaos engineering automation application that interfaces with a public cloud 303. Without limitation, a public cloud can be Amazon Web Services (AWS) or Microsoft's Azure. In other embodiments, the cloud 303 may be a private cloud 304.

The subsystem 302 may include a chaos automation control plane 304*a*, which may allow access to several services (304*b*, 304*c*, 304*d*), which in turn may be configured to perform code inspection, resource discovery, and health checks. For instance, the code inspection service may be a routine that is configured to initiate a connection between the subsystem 302 and code repository 307. There, source code and other like materials pertaining to an application under test may be found and analyzed by the code inspection service 304*b*.

The applications under test (203, 204, and 205) may be part of an application infrastructure (201) that is communicatively coupled to the subsystem 302. The applications under test may be varied in nature (204). For example, and not by limitations, they may include Kubernetes clusters, container hosts, etc. and they may include primary and alternative databases, as well as remote and/or local storage. The code inspection service 304*b* may be configured to save an inventory of services, components, and configurations resulting from its analyses of the repository 307. Savings may be created by routing the inspection service 304*b* outputs to a data storage medium 306, which may be local or remote to the subsystem 302.

Similarly, the subsystem 302 may include a resource discovery service 304*c* which may be configured to discover provisioned services and components from the application infrastructure 201. Here, the provisioned services and components may be associated with each or some of the applications in the application infrastructure 201. Results from the service 304*c* may also be saved in the data storage medium 306. Furthermore, the subsystem 302 may include a health check service 304*d* may be configured to conduct application under test health check tests by scanning the application infrastructure 201 for performance metrics pertaining to the execution of the various applications running in the application infrastructure 201. Results of the health check service 304*d* may also be saved in the data storage medium 306.

Figure 4:
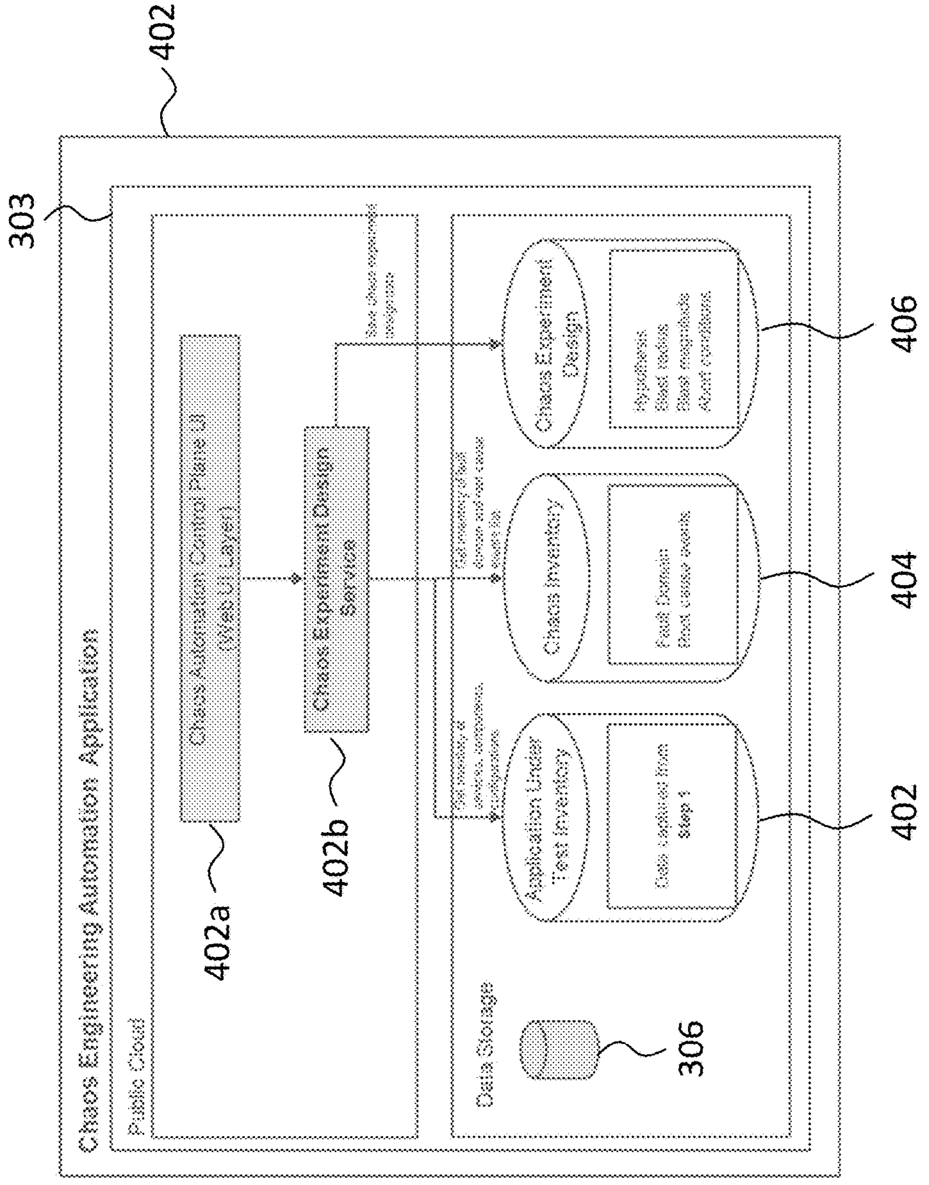
FIG. 4 illustrates a system for chaos experiment design within a chaos engineering automation application.

FIG. 4 illustrates a system for chaos experiment design within a chaos engineering automation application 400 according to an exemplary embodiment. The system 400 includes a subsystem 402, which is an embodiment of the chaos experiment and design subroutines of the method 100, as depicted in FIG. 1 and as part of the subsystem 202 of FIG. 2. The subsystem 402 can interface with a cloud 303, and it may include a chaos automation control pane 402*a* that provides a user interface for configuring various chaos experiment designs.

The subsystem 402 may further include a chaos experiment design service 402 *b* which may interface with a storage medium 306 that may be remote or local to the subsystem 402. The service 402*b* may be configured to retrieve from a section 402 of the storage medium 306 application under test inventories, which may be part of the data captured by the subsystem 302 during inspection and recovery. For example and not by limitation, these inventories may include an inventory of available services, components, and configurations.

Furthermore, the service 402*b* may be configured to obtain from a section 404 of the storage 306 inventories of fault domains and root-cause event lists associated with each of the applications under test in the application infrastructure 201. Moreover, the service 402*b* may be configured to save in a section 406 of the storage medium 306, chaos experiment design data passed through the user interface of the chaos automation control plane 402*a*. These design data may include hypotheses, blast radii, blast magnitudes, and abort conditions that are to be used when executing the chaos testing.

Figure 5:
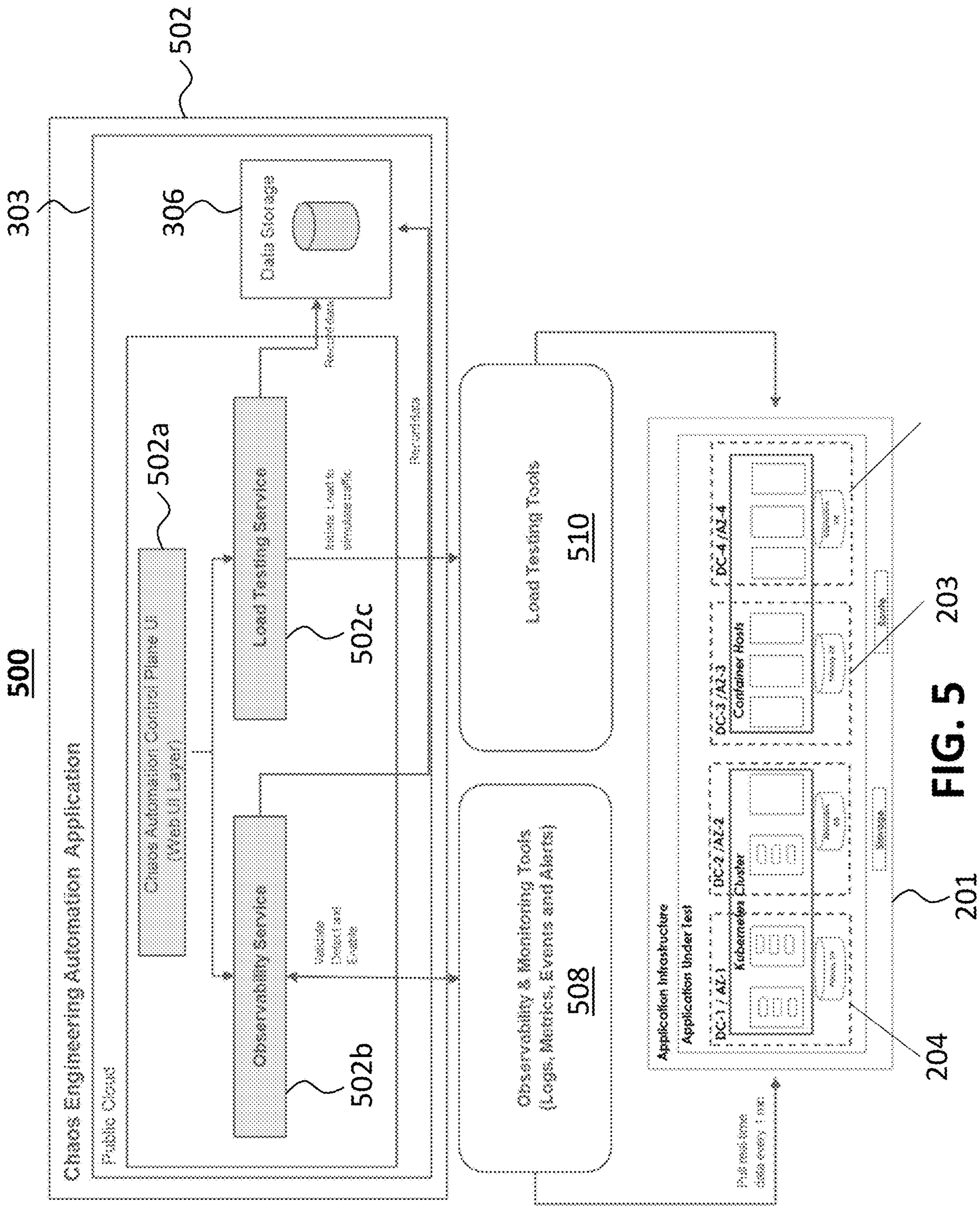
FIG. 5 illustrates a system for pre-execution tasks in chaos testing automation.

FIG. 5 illustrates a system for pre-execution tasks in chaos testing automation 500 according to an exemplary embodiment. The system 500 includes a subsystem 502, which is an embodiment of the pre-execution subroutines of the method 100, as depicted in FIG. 1 and as part of the subsystem 202 of FIG. 2. The subsystem 502 can interface with the cloud 303, and it may include a chaos automation control plane 502*a* that provides a user interface for configuring pre-execution tasks. The subsystem 502 may further include an observability service 502*b* and a load testing service 502*c*.

The observability service 502*b* may include a module 508 which may include a set of observability and monitoring tools. Such tools may be logs, metrics, events, and alerts, each being associated with the applications under test (203, 204, and 205) located in the application infrastructure 201 that is communicatively coupled to the subsystem 502.

The service 502*b* may pull real-time data from the application infrastructure 201 via the module 508. Data retrieval may be affected according to a preset frequency or in real time. For instance, and not by limitation, in the former case, data retrieval may affect every minute. The observability service 502*b* may then validate, detect, and enable alerts, and its results may be output to a remote or local data storage medium 306.

The subsystem 502 further includes a load testing service 502*c* which may be configured to invoke a set of load testing tools 510 to initiate load and simulate traffic data in the applications under test in the application infrastructure 201. Data retrieved from the load testing may be outputted by the load testing service and recording in the data storage medium 306.

Figure 6:
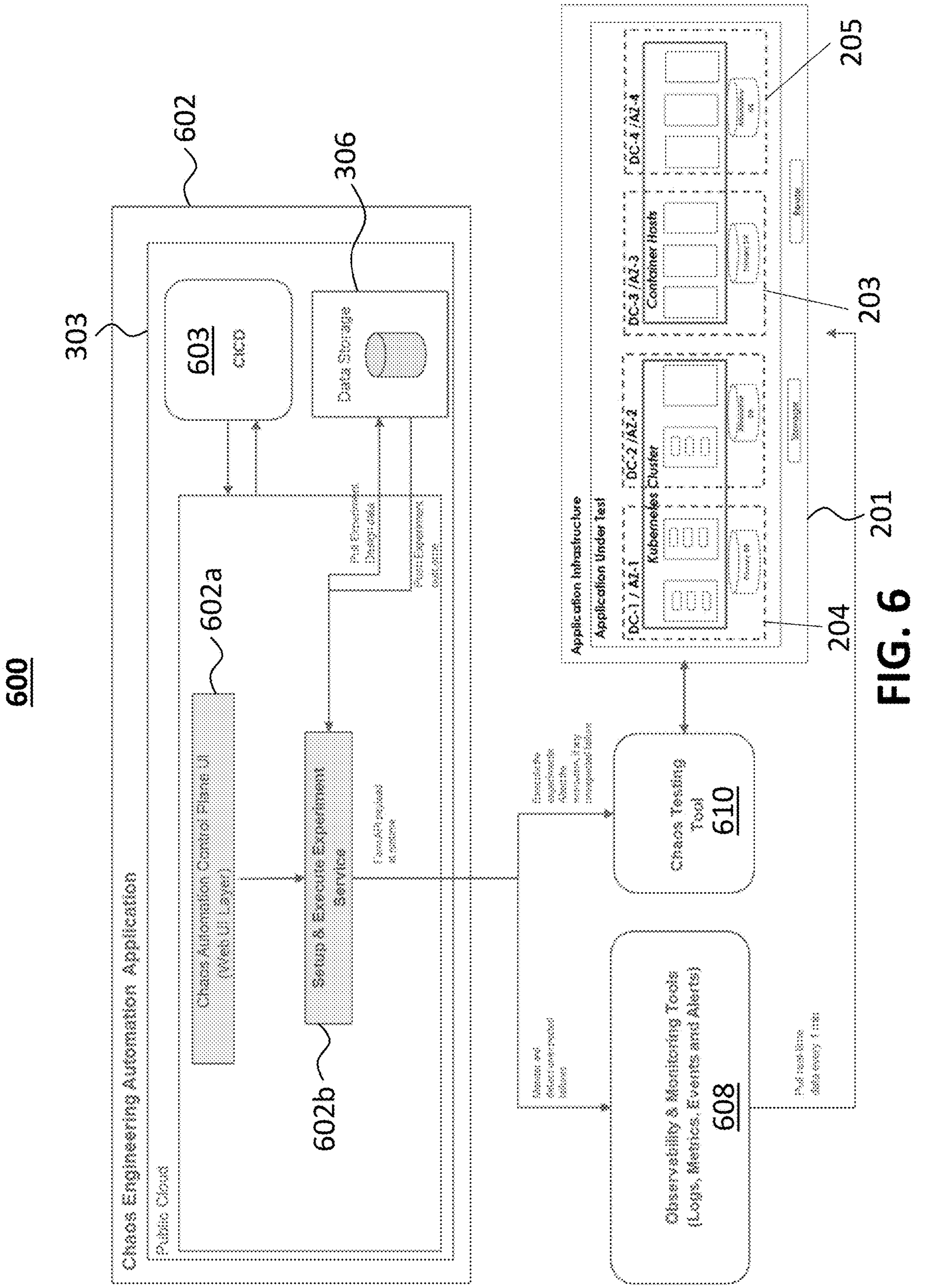
FIG. 6 illustrates a system for setting up and executing chaos experiments within a public cloud environment.

FIG. 6 illustrates a system for setting up and executing chaos experiments within a public cloud environment 600 according to an embodiment. The system 600 includes a subsystem 602, which is an embodiment of the setup and execution subroutines of the method 100, as depicted in FIG. 1 and as part of the subsystem 202 of FIG. 2. The subsystem 602 can interface with the cloud 303, and it may include a chaos automation control plane 602*a* which provides a user interface for configuring and executing various setup and chaos testing execution subroutines.

The subsystem 602 may further include a storage medium 306 in which results or outcomes of the setup and execution of a chaos experiment service 602*b* are saved and from which the service 602*b* can also pull experiment design data in real time, these data having been generated by services in the previous steps of the method 100. The setup and execution service 602*b* may be configured to invoke observability and monitoring tools of a module 608 and chaos testing tools from a module 610.

Generally, the setup and execution service 602*b* may be configured to form API payloads at run time, monitor and detect unexpected failures, execute experiments, and abort execution upon an unexpected failure. The service 602*b* may pull data in real time or according to a preset frequency.

Furthermore, the subsystem 602 may include automated tools such that the subsystem 602 may be continually integrated and deployed to the application infrastructure 201 such that no manual tasks are necessary and such that chaos testing may be consistently run to assess and validate the applications in the application infrastructure 301. Continuous integration and continuous deployment (CI/CID) may be achieved using a CICD 603 module. Such a module may be achieved, for example and not by limitation, using a tool like Jenkins.

Figure 7:
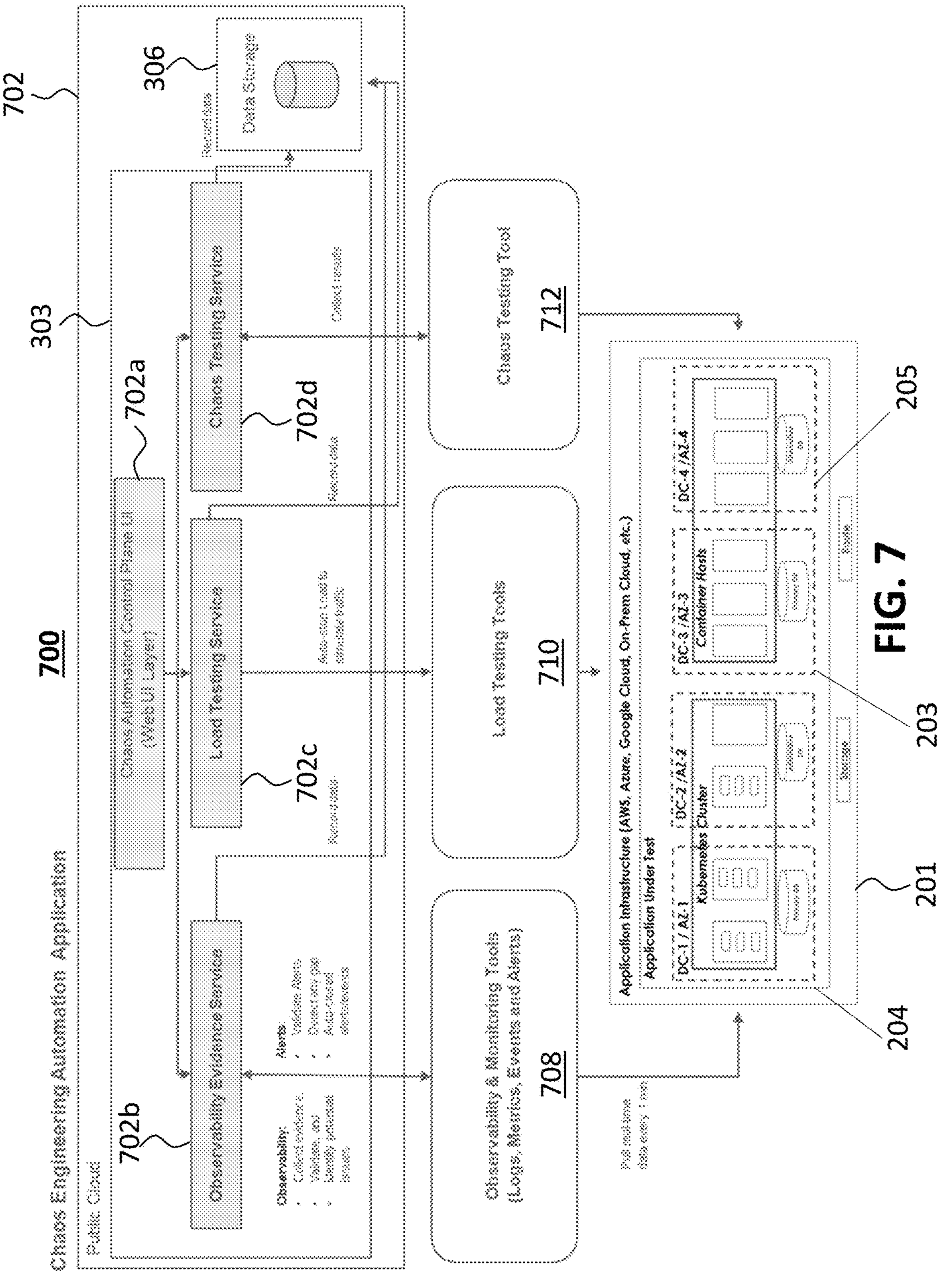
FIG. 7 illustrates a system for evidence and test result gathering in a chaos engineering automation application.

FIG. 7 illustrates a system for evidence and test result gathering in a chaos engineering automation application 700 according to an exemplary embodiment. The system 700 includes a subsystem 702, which is an embodiment of the evidence and test result gathering subroutines of the method 100, as depicted in FIG. 1 and as part of the subsystem 202 in FIG. 2. The subsystem 702 can interface with the cloud 303, and it may include a chaos automation control plane 702*a* that provides a user interface for configuration evidence and test data gathering tasks. The subsystem 702 may further include a storage medium 306, an observability evidence service 702*b*, a load testing service 702*c*, and a chaos testing service 702*d*.

The observability evidence service 702*b* may invoke a set of observability and monitoring tools in a module 708 to collect evidence, validate, and potentially identify issues that arise from executing chaos testing experiments. The tools may be executed on the applications under test (203, 204, and 205) in the application infrastructure 201. Data may be pulled in real time from the application infrastructure 201 or according to a preset frequency, which may be every minute, for example and not by limitation. The tools from these modules may then be executed on the applications under test (203, 204, and 205) in the application infrastructure 201.

The observability evidence service 702*b* may also validate alerts and detect any gap in resiliency and log auto-closed events and alerts. The outcome of this service, when executed can yield data that is recorded and further saved by the service in the storage medium 306.

The load testing service 702*c* is configured to auto-stop loads to simulate traffic. This is done by invoking load testing tools in the module 710 to act on the applications under test within the applications infrastructure. The outcomes of the load testing service 702*c* can also be saved in the storage medium 306. Similarly, the chaos testing service 702*d* can invoke tools from a chaos testing tool module 712 and subject them to the applications under test, and the results of that service can then be saved in the storage medium 306.

Figure 8:
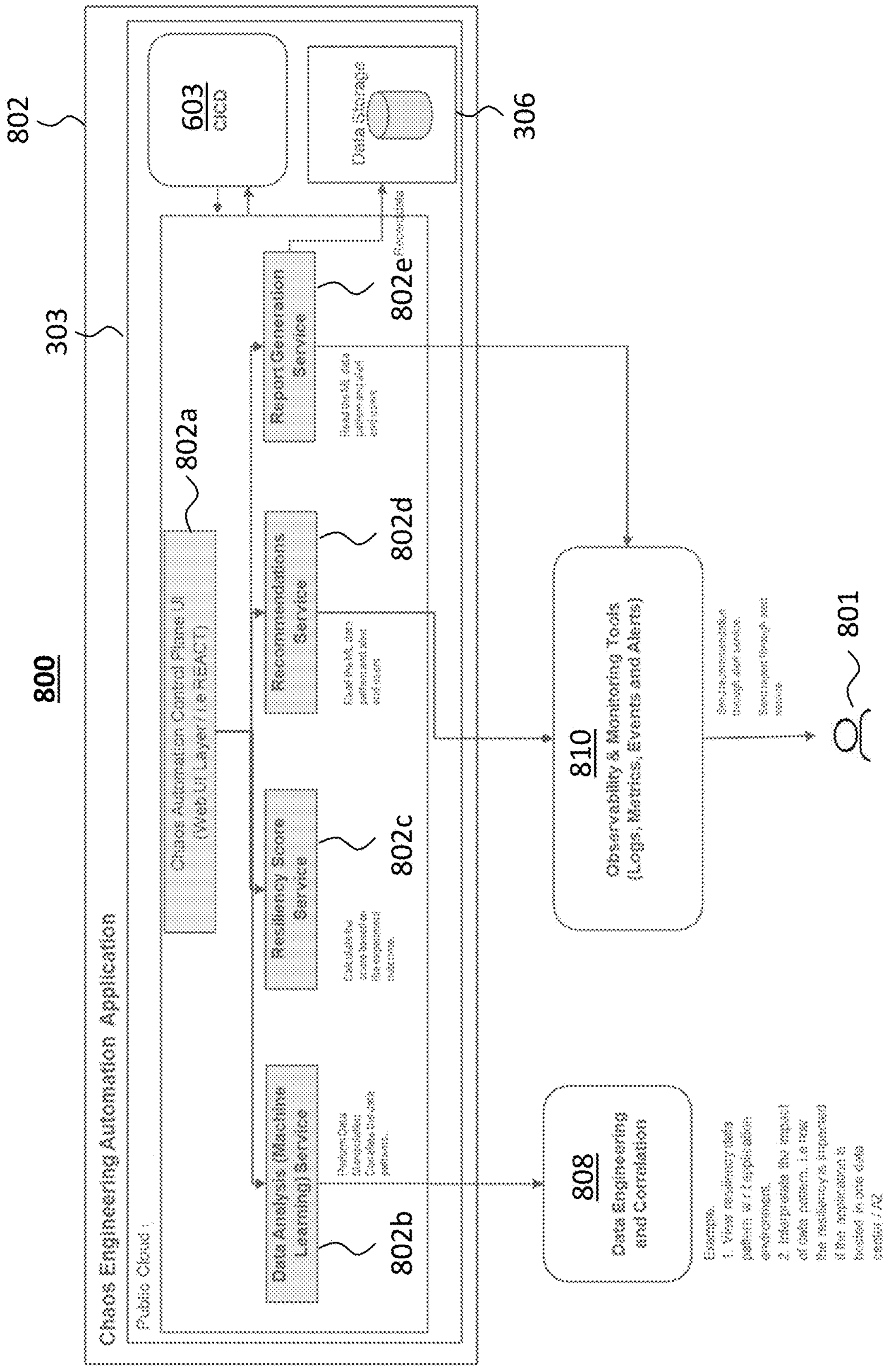
FIG. 8 illustrates a system for analyzing chaos experiment results using data engineering, observability tools, and AI/ML.

FIG. 8 illustrates a system for analyzing chaos experiment results using data engineering, observability tools, and ML 800 according to an exemplary embodiment. The system 800 includes a subsystem 802 that is an embodiment of the analysis subroutines of the method 100, as depicted in FIG. 1 and as part of the subsystem 202 of FIG. 2.

The subsystem 802 can interface with the cloud 303, and it can include a chaos automation control plane 802*a* that provides a user interface for configuring and executing tasks associated with analyzing the results of a chaos experiment undertaken on applications under test (203, 204, and 205) located in an application infrastructure 201 as shown in FIG. 7. Results of the subsystem 802 may be outputted via the plane 802*a* to a user 801, or generally to another machine communicatively coupled to the subsystem 802.

The subsystem 802 may include a data storage medium 306 in which recorded data output by the various services (802*b*, 802*c*, 802*d*, and 802*e*) of the subsystem 802 are saved. The subsystem 802 may also include a CI/CD tool 603 which allows it to continually interface with the applications under test to provide consistent and automated analysis of chaos experiments thereby obviating any manual processing of chaos experiment test results.

Generally, the subsystem 802 may perform data manipulation, correlate data patterns, calculate a score based on the chaos experiment's outcome, and read AI/ML data from the ML tools of the module 207 in FIG. 2. The subsystem 802 includes a data analysis AI/ML service 802*b*, a resiliency score service 802*c*, a recommendations service 802*d*, and a report generation service 802*e*. As shown in FIG. 8, some of these services may invoke tools from modules 808 and 810, which perform data engineering and correlation 808 and which provide observability and monitoring capabilities 810.

In one non-limiting example, the module 808 may allow the visualization of resiliency data patterns with respect to the applications'run environment, and the module 808 may allow the interpretation of these data patterns. For instance, it may allow one to determine how resiliency is impacted when the application is hosted in a particular data center versus when it is hosted in another data center. Similarly, the module 810 may send recommendations and reports through alert services of the system subsystem 802.

Figure 9:
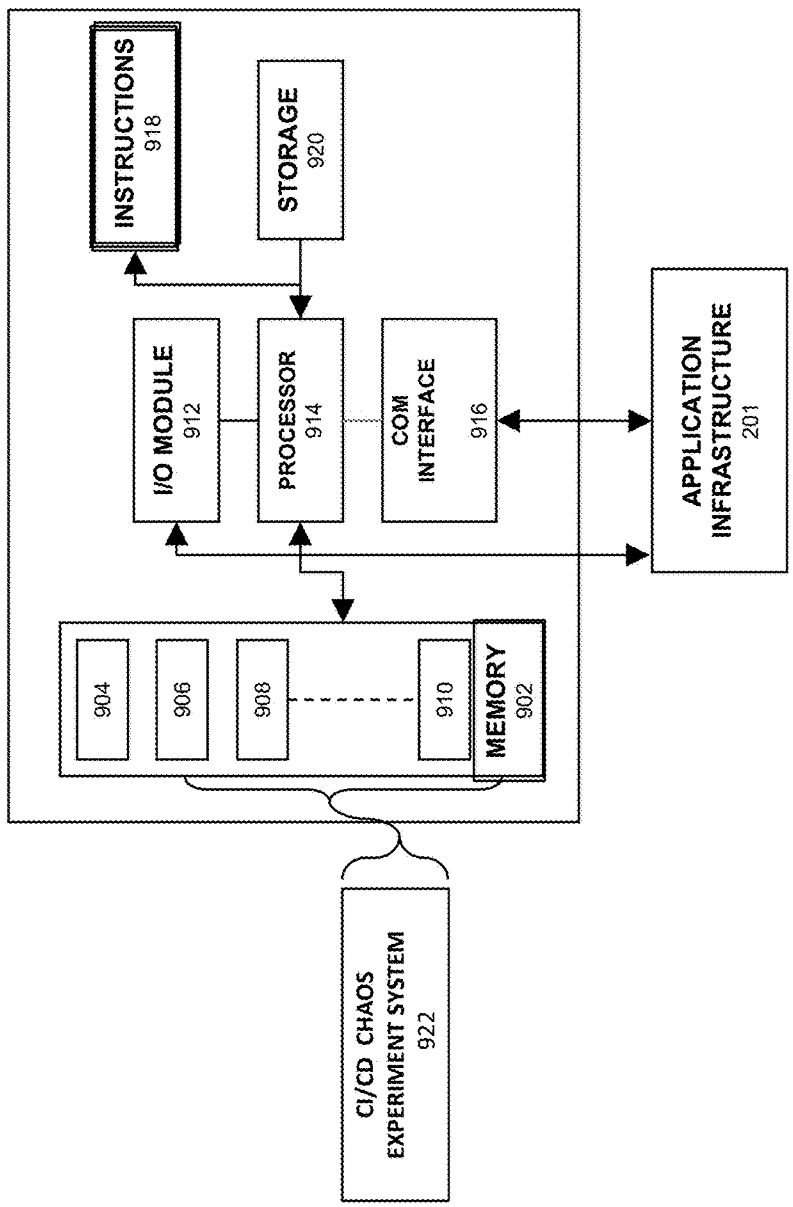
FIG. 9 illustrates an exemplary computer controller according to an embodiment.

FIG. 9 describes an exemplary computer controller upon which embodiment of the present disclosure may be practiced 900 configurable to execute the various methods and processes described above. In the system 900, each of or all of the various methods described herein, such as the method 100 and its implementations described in FIGS. 2-8, may be embodied as instructions that can cause the system 900 to perform operations consistent with CI/CD automated chaos experiment testing and analysis.

For example, the various methods may be embodied as instructions residing in a non-transitory component such as a memory or a storage device associated with the system 900. That is, the structure of the system 900 is imparted by the methods and processes like the method 100, described herein in the form of instructions.

The system 900 may be an application-specific hardware, software, and firmware implementation (or a combination thereof) configured to execute the exemplary methods described herein. The system 900 may also represent a structural and application-specific implementation of the other exemplary systems described herein (e.g., systems 200, 300, 400, 500, 600, 700, and 800). The system 900 can include a processor 914 configured to execute one or more, or all of the blocks of the exemplary methods described previously.

The processor 914 can have a specific structure imparted thereto by instructions stored in a memory 902 and/or by instructions 914 fetchable by the processor 914 from a storage medium 920. The storage medium 920 may be co-located with the system 900 as shown, or it can be remote and communicatively coupled to the system 900. Such communications may be encrypted.

The system 900 may be a stand-alone programmable system, or a programmable module included in a larger system. Also, the system 900 may include one or more hardware and/or software components configured to fetch, decode, execute, store, analyze, distribute, evaluate, and/or categorize information.

The processor 914 may include one or more processing devices or cores (not shown). In some embodiments, the processor 914 may be a plurality of processors, each having either one or more cores. The processor 914 can execute instructions fetched from the memory 902, i.e., from one of memory modules 904, 906, 908, or 910. Alternatively, the instructions can be fetched from the storage medium 920, or from a remote device connected to the system 900 via a communication interface 916. An input/output (I/O) module 912 may be configured for additional communications to or from remote systems or to a user interface from which the processor 914 may receive a set of requirements. Such additional communications may be facilitated by a communications interface 916.

Without loss of generality, the storage medium 920 and/or the memory 902 can include a volatile or non-volatile, magnetic, semiconductor, tape, optical, removable, non-removable, read-only, random-access, or any type of non-transitory computer-readable computer medium. The storage medium 920 and/or the memory 902 may include programs and/or other information usable by processor 914, such as for example, instructions 918 that enable the processor 914 to perform certain operations consistent with the teachings presented herein.

Furthermore, the storage medium 920 can be configured to log data processed, recorded, or collected during the operation of the system 900. The data may be time-stamped, location-stamped, cataloged, indexed, encrypted, and/or organized in a variety of ways consistent with data storage practice. By way of example, the memory modules 904 to 910 can form instructions that embody any one or all of the systems 200, 300, 400, 500, 600, 700, and 800.

In other words, the memory modules 904 to 910 may form a CI/CD chaos experiment system 922 that can cause the processor 914 to perform certain operations upon execution. The operations may include connecting to an application infrastructure 201 including one or more applications and inspecting a code of the one or more applications. Furthermore, the operations may include configuring a chaos experiment. The configuration may include identifying fault domains of the one or more applications.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials, and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:

a processor;

a memory including instructions, which when executed, cause the processor to perform operations including:

connecting to an application infrastructure including one or more applications;

inspecting a code of the one or more applications;

configuring a chaos experiment, the configuring including identifying fault domains of the one or more applications;

enabling pre-execution tasks, including load testing and observability;

executing the chaos experiment, the executing including automatically subjecting the one or more applications to one or more features of the chaos experiment, the one or more features being configured to trigger a fault from the fault domains;

collecting information from the one or more applications as a result of executing the chaos experiment; and executing an artificial intelligence (AI)/machine learning (ML) routine on the information to output a result, the result being representative of the resilience of the one or more applications.

2. The system of claim 1, wherein the operations further include continually integrating the chaos experiment with the one or more applications by maintaining a connection to the application infrastructure.

3. The system of claim 1, wherein the operations further include continually deploying the chaos experiment with the one or more applications by maintaining a connection to the application infrastructure.

4. The system of claim 1, wherein inspecting the code further includes generating an assessment of the health of the one or more applications.

5. The system of claim 1, wherein the operations further include pre-executing the chaos experiment to verify observability.

6. The system of claim 1, wherein the operations further include pre-executing the chaos experiment to initiate load testing.

7. The system of claim 1, wherein executing the chaos experiment further includes constructing an API for automated execution of the chaos experiment.

8. The system of claim 1, wherein the information includes events, traces, metrics, and logs associated with one or more outputs of the one or more applications before, during and after executing the chaos experiment.

9. The system of claim 1, wherein the AI/ML routine is configured to output the result in view of the information and past information.

10. The system of claim 1, the result includes at least one of a resiliency score, a recommendation, and a report.

11. A method, residing as instructions on a non-transitory computer-readable medium, the instructions configured to cause a processor to perform operations comprising:
- connecting to an application infrastructure including one or more applications;
- inspecting a code of the one or more applications;
- configuring a chaos experiment, the configuring including identifying fault domains of the one or more applications;
- enabling pre-execution tasks, including load testing and observability;
- executing the chaos experiment, the executing including automatically subjecting the one or more applications to one or more features of the chaos experiment, the one or more features being configured to trigger a fault from the fault domains;
- collecting information from the one or more applications as a result of executing the chaos experiment; and
- executing an artificial intelligence (AI)/machine learning (ML) routine on the information to output a result, the result being representative of the resilience of the one or more applications.

12. The method of claim 11, wherein the operations further include continually integrating the chaos experiment with the one or more applications by maintaining a connection to the application infrastructure.

13. The method of claim 11, wherein the operations further include continually deploying the chaos experiment with the one or more applications by maintaining a connection to the application infrastructure.

14. The method of claim 11, wherein inspecting the code further includes generating an assessment of the health of the one or more applications.

15. The method of claim 11, wherein the operations further include pre-executing the chaos experiment to verify observability.

16. The method of claim 11, wherein the operations further include pre-executing the chaos experiment to initiate load testing.

17. The method of claim 11, wherein executing the chaos experiment further includes constructing an API for automated execution of the chaos experiment.

18. The method of claim 11, wherein the information includes events, traces, metrics, and logs associated with one or more outputs of the one or more applications before, during and after executing the chaos experiment.

19. The method of claim 11, wherein the AI/ML routine is configured to output the result in view of the information and past information.

20. The method of claim 11, the result includes at least one of a resiliency score, a recommendation, and a report.

21. A non-transitory computer-readable medium including instructions configured to cause a processor to perform operations comprising:
- connecting to an application infrastructure including one or more applications;
- inspecting a code of the one or more applications;
- configuring a chaos experiment, the configuring including identifying fault domains of the one or more applications;
- enabling pre-execution tasks, including load testing and observability;
- executing the chaos experiment, the executing including automatically subjecting the one or more applications to one or more features of the chaos experiment, the one or more features being configured to trigger a fault from the fault domains;
- collecting information from the one or more applications as a result of executing the chaos experiment; and
- executing an artificial intelligence (AI)/machine learning (ML) routine on the information to output a result, the result being representative of the resilience of the one or more applications.

22. The non-transitory computer-readable medium of claim 21, wherein the operations further include continually integrating the chaos experiment with the one or more applications by maintaining a connection to the application infrastructure.

23. The non-transitory computer-readable medium of claim 21, wherein the operations further include continually deploying the chaos experiment with the one or more applications by maintaining a connection to the application infrastructure.

24. The non-transitory computer-readable medium of claim 21, wherein the operations further include pre-executing the chaos experiment to verify observability.

25. The non-transitory computer-readable medium of claim 21, wherein the operations further include pre-executing the chaos experiment to initiate load testing.

26. The non-transitory computer-readable medium of claim 21, wherein executing the chaos experiment further includes constructing an API for automated execution of the chaos experiment.

27. The non-transitory computer-readable medium of claim 21, wherein the information includes events, traces, metrics, and logs associated with one or more outputs of the one or more applications before, during and after executing the chaos experiment.

28. The non-transitory computer-readable medium of claim 21, wherein the AI/ML routine is configured to output the result in view of the information and past information.

29. The non-transitory computer-readable medium of claim 21, the result includes at least one of a resiliency score, a recommendation, and a report.

* * * * *